(12) United States Patent
Thollabandi et al.

(10) Patent No.: US 10,148,350 B2
(45) Date of Patent: Dec. 4, 2018

(54) METHOD AND SYSTEM FOR DIFFERENTIATING MACRO-BEND LOSSES FROM SPLICE AND CONNECTOR LOSSES IN FIBER-OPTIC LINKS

(71) Applicant: Sterlite Technologies Ltd., Aurangabad (IN)

(72) Inventors: Madhan Thollabandi, Aurangabad (IN); Nagaraju Bezawada, Aurangabad (IN); Pramod Watekar, Aurangabad (IN)

(73) Assignee: Sterlite Technologies Ltd., Aurangabad Maharashtra (IN)

( * ) Notice: Subject to any disclaimer, the term of this patent is extended or adjusted under 35 U.S.C. 154(b) by 39 days.

(21) Appl. No.: 15/473,396

(22) Filed: Mar. 29, 2017

(65) Prior Publication Data

US 2018/0198519 A1    Jul. 12, 2018

(30) Foreign Application Priority Data

Jan. 6, 2017   (IN) .............................. 201721000632

(51) Int. Cl.
| | |
|---|---|
| *H04B 10/071* | (2013.01) |
| *G01M 11/00* | (2006.01) |
| *H04B 10/2537* | (2013.01) |
| *H04B 10/2569* | (2013.01) |
| *H04B 10/079* | (2013.01) |

(52) U.S. Cl.
CPC .......... *H04B 10/071* (2013.01); *G01M 11/31* (2013.01); *H04B 10/07955* (2013.01); *H04B 10/2537* (2013.01); *H04B 10/2569* (2013.01)

(58) Field of Classification Search
CPC ............ H04B 10/071; H04B 10/07955; H04B 10/2537
See application file for complete search history.

(56) References Cited

U.S. PATENT DOCUMENTS

| | | | |
|---|---|---|---|
| 2003/0123776 A1* | 7/2003 | Koch .................... | G02B 6/278 385/11 |
| 2008/0192241 A1* | 8/2008 | He ....................... | G02B 6/2852 356/73.1 |
| 2011/0211794 A1* | 9/2011 | Ruzzier ................. | G02B 6/449 385/111 |

(Continued)

*Primary Examiner* — David Payne
*Assistant Examiner* — Pranesh Barua
(74) *Attorney, Agent, or Firm* — Kolisch Hartwell, P.C.

(57) ABSTRACT

The present disclosure provides a method and system of identifying macro-bends in at least one test fiber. The method includes generation of modulated optical pulses and scrambling the state of polarization of the modulated optical pulses to random states of polarization. The method includes injection of the modulated optical pulses in at least one test fiber and reception of backscattered optical pulses and splitting of the backscattered optical pulses to a first optical component and a second component. The method includes measurement of a first power of the first optical component and a second power of the second optical component of the backscattered optical pulses. The method includes calculation of discrete values of polarization dependent loss as a function of distance and identification of the macro-bends by analysis of peaks in one or more plots of one or more traces of the discrete values of the polarization dependent loss.

13 Claims, 4 Drawing Sheets

(56) References Cited

U.S. PATENT DOCUMENTS

| | | | |
|---|---|---|---|
| 2014/0255023 A1* | 9/2014 | Kishida | G01H 9/004 |
| | | | 398/21 |
| 2016/0123837 A1* | 5/2016 | Chen | G01M 11/088 |
| | | | 356/73.1 |
| 2017/0307473 A1* | 10/2017 | Chen | G01M 11/3127 |
| 2018/0006715 A1* | 1/2018 | Tyagi | H04B 10/071 |

* cited by examiner

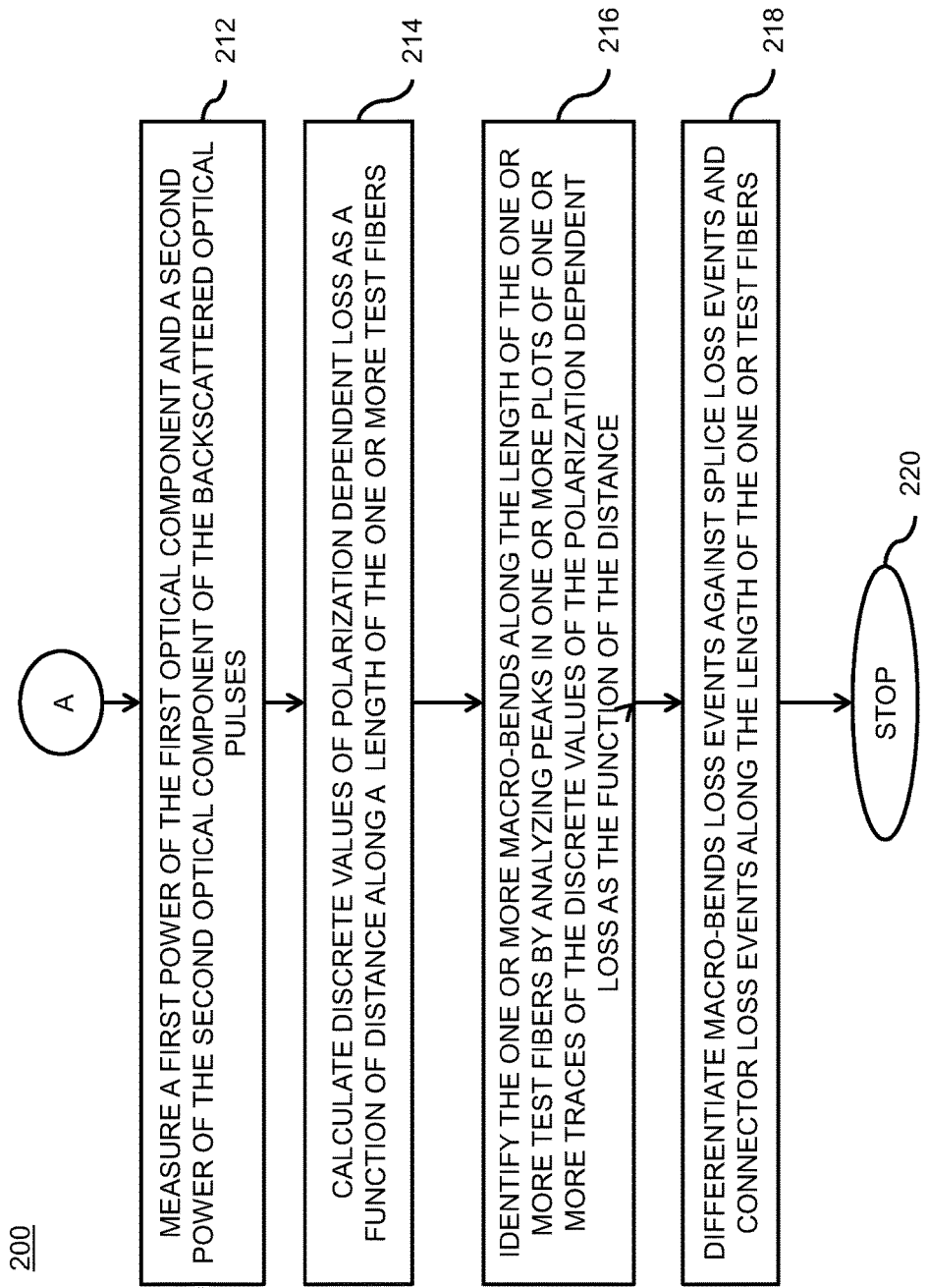

METHOD AND SYSTEM FOR DIFFERENTIATING MACRO-BEND LOSSES FROM SPLICE AND CONNECTOR LOSSES IN FIBER-OPTIC LINKS

TECHNICAL FIELD

The present disclosure relates to the field of fiber optics and, in particular, relates to method and system for differentiating macro bend losses from splice and connector losses in optical communication link under test.

BACKGROUND

Optical communication networks are traditionally built upon a large network of optic cable links. These optic cable links consists of long and branched span of optical fibers. These optical fibers are generally joined together by splice connections or connectorization. Moreover, these optical fibers are also connected to various passive components like joint-closures, power splitters and filters. As the fibers are subjected through various splice, connector connections and bends, the optical signals in these fibers suffer losses. The optical signal suffers losses primarily due to attenuation of the fiber, apart from losses due to splice joints and connector joints. Optical fiber links are also subjected to bends e.g. macro-bends and stresses from cabling process.

Traditionally, optical time domain reflectometer (OTDR) is used to measure and characterize various loss events in the optical fiber link. Further, optical probing pulses are injected into these optical fibers. The optical probing pulses suffer from Fresnel reflections at various splice joints and connector joints. They also suffer from Rayleigh scattering along the length of the optical link and from macro-bends and stresses. The back scattered and back reflected pulses carry weak power and are detected by the sensitive receiver circuitry of OTDR. The OTDR measures the intensity of the back scattered optical signal and provides information of all loss events at various discrete points along the length of the optical fiber link.

In one of the prior arts, a method for intrusion detection in optical fiber is provided. The method and system disclosed in the prior art calculates insertion loss of the optical fiber which is sensitive to macro-bends, splice joints and connector joints. The prior art does not discuss any concrete method and system of differentiating macro-bend losses from splice joint and connector joint losses. The prior art does not derive any method or system that specifically mentions polarization dependent loss measurement as a mechanism to differentiate the macro-bends event signatures from splice and connector loss event signatures. In addition, the stated prior art and other prior arts are not very sensitive when it comes to identifying the macro bends in bend-insensitive fibers. They also require sophisticated algorithms and measurement time for testing of optical fiber links against macro-bend losses and therefore, they are unreliable for real time commercial applications.

In another prior art, the macro-bend losses are separately calculated using multi-wavelength OTDR. The multi-wavelength OTDR calculates macro-bend losses in the optical fibers. However, the multi-wavelength OTDR uses a multi-wavelength optical signal to probe the optical fiber against different losses. The use of multi-wavelength optical signal increases measurement complexity. The principle of operation of the multi-wavelength OTDR is based on the principle that macro-bend losses are a function of operating wavelength. The macro-bend loss increases exponentially with increase in operating wavelength. In addition, the measurement time increases in multi-wavelength OTDR as sophisticated algorithms are needed to process the multi-wavelength OTDR traces and are susceptible to fault tolerance.

High speed data transmission is more sensitive to the macro-bends in optical fibers compared to losses from splice joints and connector joints. Current monitoring methods are not able to distinguish between macro-bend losses from splice joint and connector joint losses.

In light of the above stated discussion, there is a need for a method and system that distinguishes macro-bend losses from splice joint and connector joint losses.

SUMMARY

In an aspect, the present disclosure provides a method for identification of one or more macro-bends in an optical fiber communication link and differentiation of macro-bend loss events from splice loss events and connector loss events in the optical fiber communication link. The optical fiber communication link includes at least one test fiber. The method includes a first step of generating modulated optical pulses. The modulated optical pulses have a pre-defined optical carrier wavelength, a pre-defined optical peak power, a pre-defined optical pulse width, a pre-defined optical pulse repetition frequency and a state of polarization. Further, the method includes another step of injecting the modulated optical pulses in the at least one test fiber of one or more test fibers. The method includes yet another step of receiving backscattered optical pulses corresponding to the modulated optical pulses. Furthermore, the method includes yet another step of splitting the backscattered optical pulses to a first optical component and a second component by a polarization beam splitter, the first optical component and the second optical component are characteristically polarized components of the modulated optical pulses. The method includes yet another step of measuring a first power of the first optical component and a second power of the second optical component of the backscattered optical pulses. The method includes yet another step of calculating discrete values of polarization dependent loss as a function of distance along a length of the one or more test fibers. Moreover, the distance is dependent on selection of the pre-defined optical peak power and the pre-defined optical pulse width of the modulated optical pulses. Further, the method includes yet another step of identifying the one or more macro-bends along the length of the one or more test fibers. The one or more macro-bends are identified based on analysis of peaks in one or more plots of one or more traces of the discrete values of the polarization dependent loss. In addition, the method includes yet another step of differentiating the macro-bend loss events against the splice loss events and the connector loss events along the length of the one or test fibers. Further, the state of polarization of modulated optical pulses is scrambled to random states of polarization. The pre-defined optical carrier wavelength lies in a band selected from a group of bands. The group of band includes an original band (O-band), an extended band (E-band), a short band (S-band), a conventional band (C-band), a long band (L-band) and an ultra-long band (U-band). The original band is characterized by a wavelength in range of 1260 nm to 1360 nm. The extended band is characterized by a wavelength in range of 1360 nm to 1460 nm. The short band is characterized by a wavelength in a range of 1460 nm to 1535 nm. The conventional band is characterized by a wavelength in a range of 1535 nm to 1565 nm. The long band is characterized by a wavelength in a range of 1565 nm to 1625 nm and the ultra-long band is characterized by a wavelength in a range of 1625 nm to 1675 nm. The pre-defined optical peak power lies in a range of 0 dBm to 10 dBm. The pre-defined optical pulse width lies in a range of picoseconds to seconds and the pre-defined optical pulse-repetition frequency lies in a range of Hz to MHz. The backscattered optical pulses are obtained after Rayleigh scattering in the one or more macro-bends, one or more splice joints and one or more connector joints of the at least one test fiber of the one or more test fibers. Further, the first optical component is defined along a first principle polarization state of test fiber and the second optical component is defined along a second principle polarization state of the test fiber. The first principle polarization state of optical fiber and the second principle polarization state of the test fiber are orthogonal.

In an embodiment of the present disclosure, the method includes yet another step of processing electrical signals. The electrical signals correspond to the backscattered optical pulses. The electrical signals are synchronously resampled and filtered for removal of noise and improvement in the signal to noise ratio.

In an embodiment of the present disclosure, the method includes yet another step of increasing sensitivity of measuring the first power of the first optical component, the second power of the second optical component and the discrete values of the polarization dependent loss. The sensitivity is increased based on shifts in the pre-defined optical carrier wavelength from O-band to U-band.

In an embodiment of the present disclosure, each discrete value of the polarization dependent loss is calculated from a logarithm of a ratio of the first power and the second power. The first power corresponds to the first principle polarization state of optical component and second power corresponds to the second principle polarization state of optical component. Each discrete value of the polarization dependent loss is a function of a bend radius, a number of macro-bends and on optical carrier wavelength of the modulated optical pulses. In addition, the bend-radius lies in a range of 1 mm-30 mm.

In an embodiment of the present disclosure, one or more traces are generated from the discrete values of the polarization dependent loss as the function of distance for each test fiber of the one or more test fibers. Each trace of the one or more traces corresponds to a segment of optical link of the one or more test fibers.

In an embodiment of the present disclosure, the one or more macro-bends are characterized by a bend radius and a number of loops.

In an embodiment of the present disclosure, each random state of polarization maps to a single spherical coordinate on a Poincare sphere. The random states of polarization of the modulated optical pulses are scrambled at a pre-defined scrambling rate. The pre-defined scrambling rate lies in a range of Hz to KHz.

In an embodiment of the present disclosure, each test fiber of the one or more test fibers is physically characterized by the one or more macro-bends, the one or more splice joints and the one or more connector points. Moreover, each test fiber of the one or more test fibers is a single mode fiber.

In an embodiment of the present disclosure, each test fiber is selected from a group of optical fibers. The group of optical fibers includes a standard single mode fiber-G.652D fiber, a dispersion shifted fiber-a G.653 fiber, a cut-off shifted fiber-a G.654 fiber, a non-zero dispersion shifted fiber-a G.655 fiber and a bend-insensitive fiber-G.657 fiber.

In another aspect, the present disclosure provides a system for identifying one or more macro-bends in an optical fiber communication link and differentiating macro-bend loss events from splice and connector loss events. The optical fiber communication link includes at least one test fiber. The system includes an optical source for generation of the optical signals. The optical signals have a pre-defined optical carrier wavelength, a pre-defined optical peak power and a state of polarization. Further, the system includes a pulse generator for generating electrical pulses. The electrical pulses have a pre-defined pulse width, a pre-defined pulse repetition frequency and a pre-defined electrical RF output power. The system includes an optical pulse modulator. The optical pulse modulator modulates the optical signals to modulated optical pulses. The modulated optical pulse has the pre-defined optical pulse width, the pre-defined optical pulse repetition frequency and the state of polarization. The system includes a polarization scrambler. The polarization scrambler scrambles the state of polarization of the modulated optical pulses to random states of polarization. The system includes an optical circulator for injecting the modulated optical pulses in at least one test fiber of one or more test fibers. Moreover, the system includes an optical fiber link. The optical fiber link includes the one or more test fibers. The one or more test fibers have varying length of span, a number of macro-bend points of varying bend radius and joined together by one or more splice joints and one more connector joints. The optical fiber link emulates an optical link under test. Moreover, the system includes a polarization beam splitter. The polarization beam splitter splits backscattered optical pulses to a first optical component and a second component. The first optical component and the second optical component are characteristically polarized components of the modulated optical pulses. Moreover, the system includes a first photo detector for measurement of a first power and a second photo detector for measurement of a second power of the first optical component and the second optical component of the backscattered optical pulses. Moreover, the system includes a processing device. The processing device processes received electrical signals from the first photo detector and the second photo detector. The electrical signals correspond to the backscattered optical pulses. Moreover, the system includes a clock source. The clock source generates an electrical clock signal for synchronization of operations of the processing device and the pulse generator. The electrical clock signal has a pre-defined clock repetition frequency. In addition, the system includes an analyzing device. The analyzing device calculates discrete values of polarization dependent loss as a function of distance along a length of the one or more test fibers. Moreover, the analyzing device identifies the one or more macro-bends based on analysis of peaks in one or more plots of one or more traces of the discrete values of the polarization dependent loss. Also, the analyzing device differentiates the macro-bend loss events from the splice and connector loss events along the length of the one or more test fibers. The optical pulse modulator is optically linked to the optical source and electrically linked to the pulse generator. The polarization scrambler is optically linked to the optical pulse modulator. The optical circulator is optically linked to the polarization scrambler. The optical fiber link is optically linked to the optical circulator. The polarization beam splitter is optically linked to the optical circulator. The first photo detector and the second photo detector are optically linked to the polarization beam splitter. The processing device is electrically linked to the first photo detector and the second photo detector. Further, the first optical component is defined along a first principle polarization state of optical fiber and the second optical component is defined along a second principle polarization state of optical fiber. The first principle polarization state of optical fiber and the second principle polarization state of optical fiber are orthogonal. The processing device resamples the received electrical signals, removes unwarranted signal components to filter noise and improves a signal to noise ratio.

In an embodiment of the present disclosure, the optical source is directly modulated by the pulse generator. The optical source directly generates the modulated optical pulses. The optical source is optically linked to the polarization scrambler and electrically linked to the pulse generator.

In an embodiment of the present disclosure, the one or more traces from the discrete values of the polarization dependent loss are generated as the function of the distance for each test fiber of the one or more test fibers. Each trace of the one or more traces corresponds to a segment of the length of the one or more test fibers. In an embodiment of the present disclosure, each discrete value of the polarization dependent loss is calculated from a logarithm of a ratio of the first power and the second power. The first power corresponds to the first optical component and the second power corresponds to the second optical component. Each discrete value of the polarization dependent loss is a function of a bend radius, a number of macro-bends and the pre-defined optical carrier wavelength of the modulated optical pulses.

Moreover, the bend-radius lies in a range of 1 mm-30 mm.

BRIEF DESCRIPTION OF FIGURES

Figure 1A:
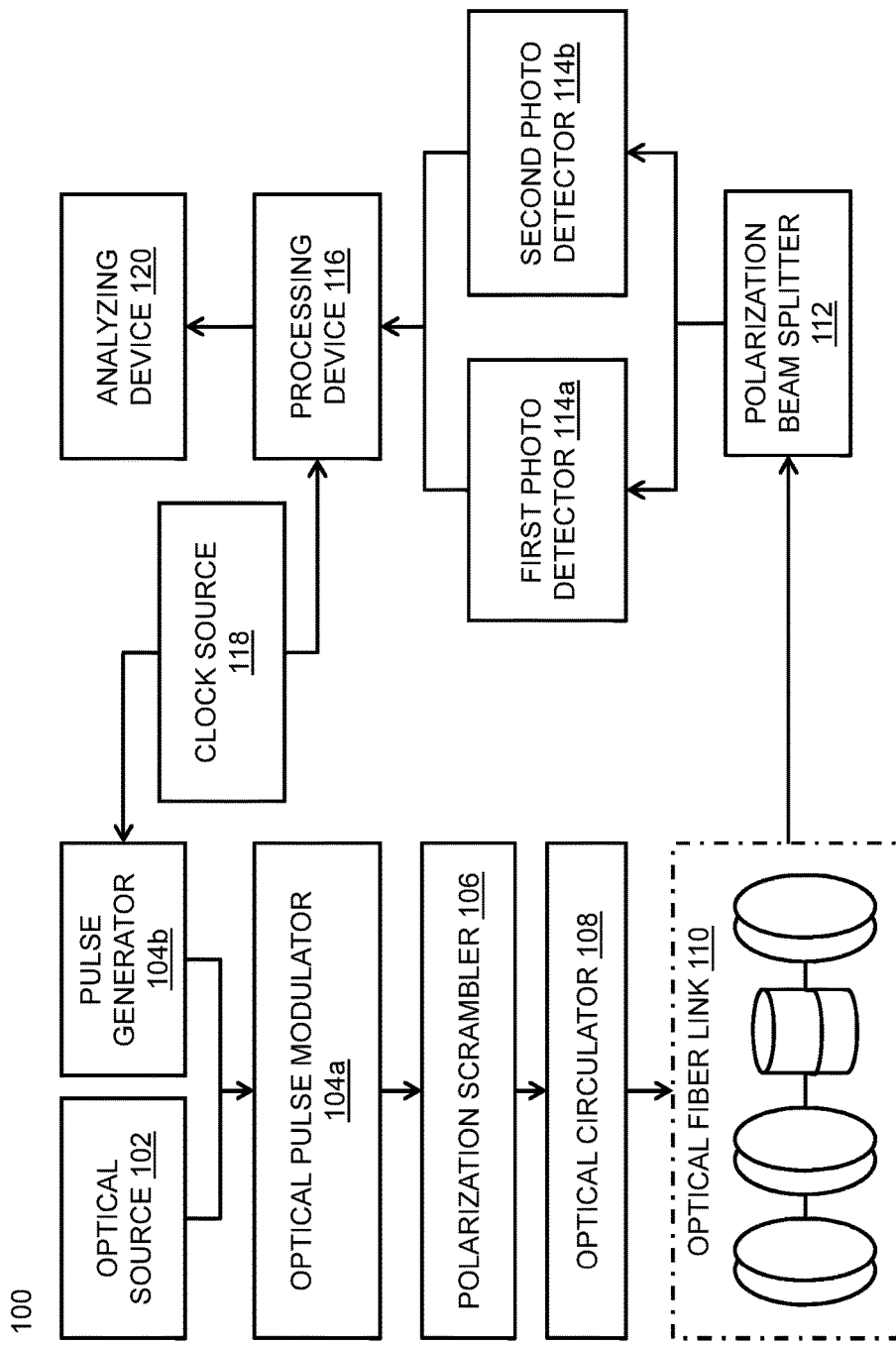
Figure 1B:
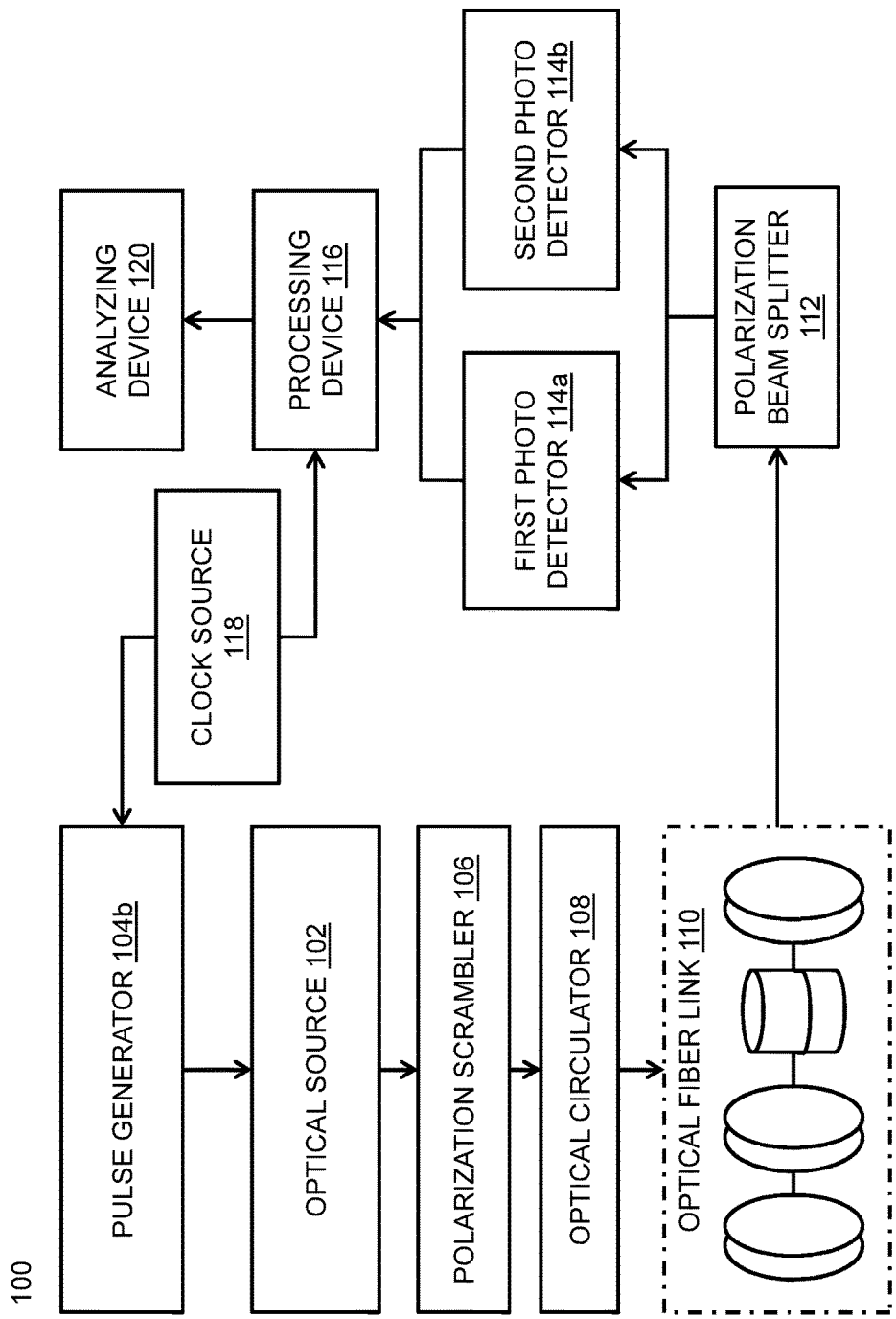
Figure 2A:
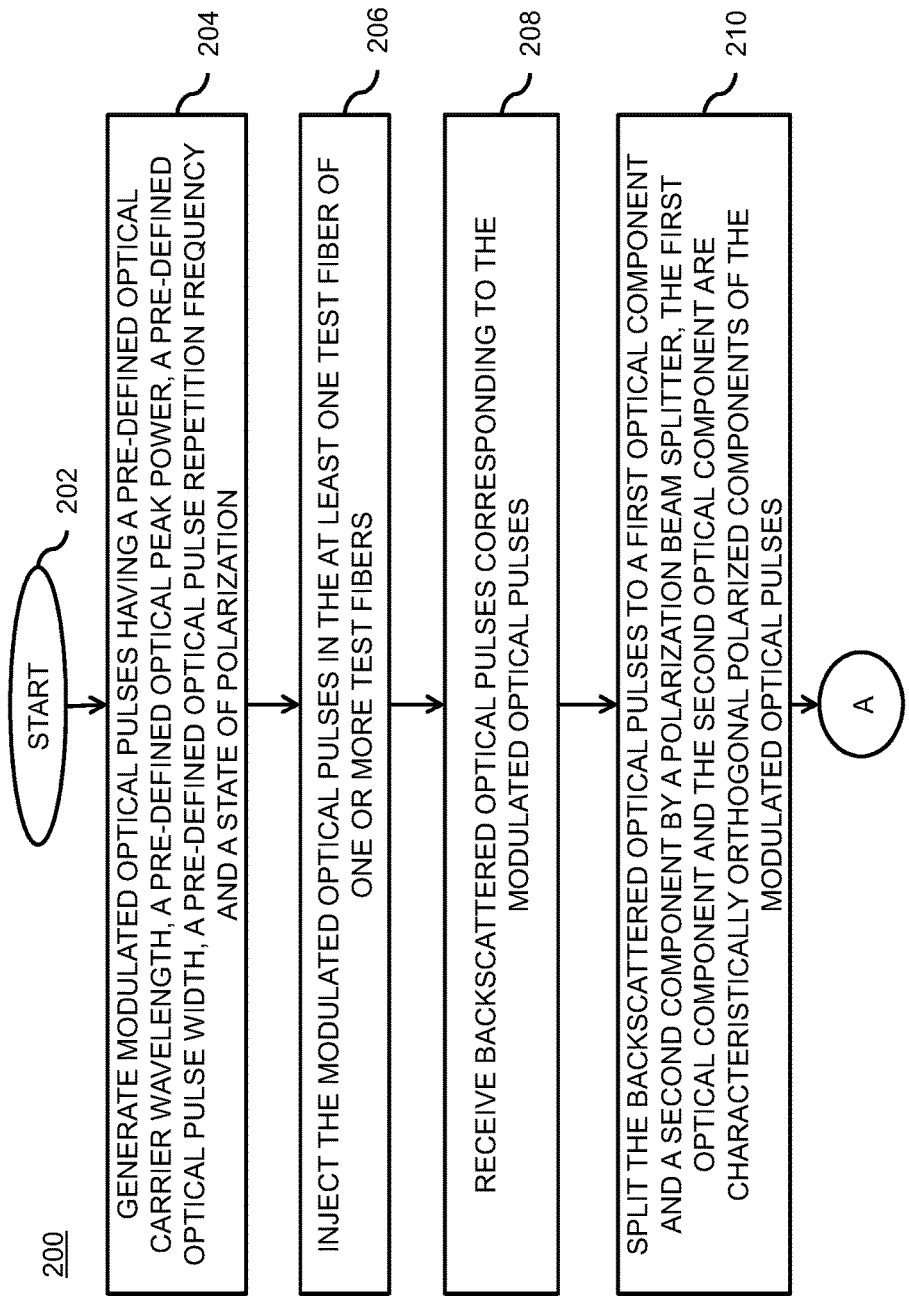

Having thus described the disclosure in general terms, reference will now be made to the accompanying figures, wherein:

FIG. 1A illustrates the block diagram of a method for identifying macro-bend losses and differentiating them from splice losses and connector losses in at least one test fiber of one or more test fibers, in accordance with an embodiment of the present disclosure;

FIG. 1B illustrates the block diagram of the method for identifying macro-bend losses and differentiating them from the splice losses and the connector losses in at least one test fiber of one or more test fibers, in accordance with another embodiment of the present disclosure; and FIGS. 2A and 2B illustrate a flow chart for identifying the macro-bend losses and differentiating them from the splice losses and the connector losses in at least one or more test fibers, in accordance with various embodiments of the present disclosure. It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1A illustrates a block diagram 100 of a system for identification of macro-bend losses and differentiation of macro-bend losses from splice and connector losses in at least one test fiber, in accordance with an embodiment of the present disclosure. The identification of the macro-bend losses is based on characteristics of one or more macro-bends to display significant changes in Rayleigh scattering against different states of polarizations. The macro-bend losses in optical fiber links are characterized by a polarization dependent loss whereas the attenuation or insertion losses at splice joints and connectors are polarization independent. The polarization dependent loss is dependent primarily on the localized birefringence caused by the one or more macro-bends in optical fibers. In general, the polarization dependent loss is defined as peak to peak power throughput variation when input is exposed to every state of polarization. The polarization dependent loss is significantly dependent on one or more characteristics of the fiber optic links. The one or more characteristics include a number of the macro-bends, a number of full circle loops in each macro-bend, degree of bend radius and a wavelength of the optical carrier signal. Accordingly, the polarization dependent loss uniquely distinguishes the macro-bends from one or more splice joints and one or more connectors.

The block diagram 100 includes an optical source 102, an optical pulse modulator 104a, a pulse generator 104b, a polarization scrambler 106, an optical circulator 108, an optical fiber link 110 and a polarization beam splitter 112. In addition, the block diagram 100 includes a first photo detector 114a, a second photo detector 114b, a processing device 116, a clock source 118 and an analyzing device 120. The above arrangement facilitates calculation of polarization dependent loss along the optical fiber link 110 and identification of the one or more macro-bends in the optical fiber link 110. Moreover, the above arrangement facilitates differentiation the one or more macro-bends from the one or more splice joints and the one or more connector joints.

The measurement of the polarization dependent loss begins from generation of required optical signals. The optical source 102 generates optical signals. The optical source 102 may be any optoelectronic device for generation of the optical signals. In an embodiment of the present disclosure, the optical source 102 is a distributed feedback laser diode. The optical source 102 may be any standard laser source. Example of the standard laser source includes but may not be limited to a standard laser, a double hetero structure laser, separate confinement laser (SCH) and a distributed Bragg reflector laser. Moreover, the standard laser source may be a quantum well laser, a quantum dot laser, a quantum cascade laser and an external cavity laser. In addition, the optical source 102 may be any hybrid laser source. The optical source 102 generates narrow band optical signals at a wavelength operating in any one of the wavelength bands. Examples of the wavelength bands include an original band (hereinafter, "O-band"), an extended band (hereinafter, "E-band"), a short band (hereinafter, "S-band"), a conventional band (hereinafter, "C-band"), a long band (hereinafter, "L-band") and an ultra-long band (hereinafter, "L-band"). The optical source 102 generates optical signals having an optical signal power in a range of 0 dBm to 10 dBm.

The optical signals generated from the optical source 102 are pulse modulated to obtain modulated optical pulses. The optical signals are pulse modulated by utilizing an optical modulating device. The optical modulating device may any one of an acoustic optic modulator (AOM), an electro-absorption modulator (EAM) and an electro-optic modulator (EOM). For example, the electro-optic modulator is a LibNO$_3$ based Mach Zehnder modulator.

In an embodiment of the present disclosure, the optical pulse modulator 104a modulates the optical signals. The optical signals are characterized by a pre-defined optical carrier wavelength, a pre-defined optical peak power and a state of polarization. The optical signals from the optical source 102 are transferred to the optical pulse modulator 104a. The optical pulse modulator 104a is electrically linked to the pulse generator 104b. The pulse generator 104b generates electrical pulses for modulation of optical signals to the modulated optical pulses. The electrical signals from the pulse generator 104b have a pre-defined pulse width, a pre-defined pulse repetition frequency and a pre-defined electrical RF output power. The pre-defined electrical RF output power corresponds to power levels of the radio frequency electrical signals from the pulse generator 104b. In an embodiment of the present disclosure, the pulse generator 104b is electrically linked to the optical pulse modulator 104a. In another embodiment of the present disclosure, the pulse generator 104b is electrical linked to the optical source for direct pulse modulation (as shown in FIG. 1B). The electrical signals from the pulse generator 104b correspond to digital pulses having the pre-defined pulse width. The pre-defined pulse width lies in the range of picoseconds to seconds. The optical pulse modulator 104a uses the electrical signals to modulate the optical signals to the modulated optical pulses. The modulated optical pulses are characterized by a pre-defined peak optical power, a pre-defined optical carrier wavelength, the pre-defined optical pulse width and a pre-defined optical pulse repetition frequency.

The pre-defined optical carrier wavelength corresponds to wavelengths of high frequency optical signals generated from the optical source 102 for optical modulation. The pre-defined optical carrier wavelength lies in a band selected from a group of bands comprising the O-band, the E-band, the S-band, the C-band, the L-band and the U-band. In an embodiment of the present disclosure, the 0 band is characterized by a wavelength in a range of 1260 nanometers to 1360 nanometers. In another embodiment of the present disclosure, the E-band is characterized by a wavelength in a range of 1360 nanometers to 1460 nanometers. In yet another embodiment of the present disclosure, the S-band is characterized by a wavelength in a range of 1460 nanometers to 1535 nanometers. In yet another embodiment of the present disclosure, the C-band is characterized by a wavelength in a range of 1535 nanometers to 1565 nanometers. In yet another embodiment of the present disclosure, the L-band is characterized by a wavelength in a range of 1565 nanometers to 1625 nanometers. In yet another embodiment of the present disclosure, the U-band is characterized by a wavelength in a range of 1625 nanometers to 1675 nanometers.

The optical pulse repetition frequency of the modulated optical pulses is a rate at which optical pulses in the modulated optical pulses are generated. The pre-defined pulse-repetition frequency lies in a range of Hz to MHz.

In another embodiment of the present disclosure, the optical source 102 modulates the optical signal (as shown in FIG. 1B). The optical source 102 directly generates modulated optical pulses. The modulated optical pulses have the pre-defined optical carrier wavelength, the pre-defined optical peak power, the pre-defined optical pulse width, the pre-defined optical pulse repetition frequency and the state of polarization. The digital pulses from the pulse generator 104b are input to the optical source 102. The digital pulses directly modulate the current in an active region of the optical source 102. The output from the optical source 102 is modulated optical pulses with a peak optical power. The peak optical power lies in the range 0 dBm to 10 dBm and adjusted by varying the bias current of the optical source 102. The width of the modulated optical pulses can be varied by controlling the width of digital pulses from the pulse generator 104b. The modulated optical pulse width characterizes the minimum achievable system resolution.

In an embodiment of the present disclosure, the modulated optical pulses are transmitted from the optical pulse modulator 104a to the polarization scrambler 106 through one or more optical links. In another embodiment of the present disclosure, the modulated optical pulses are transmitted directly from the optical source 102 to the polarization scrambler 106 through one or more optical links (as shown in FIG. 1B). The polarization scrambler 106 is an optoelectronic device for varying a normalized stokes vector of the state of polarization of the modulated optical pulses over a Poincare sphere. The polarization scrambler 106 scrambles the state of polarization of the modulated optical pulses to random states of polarization. Each random state of polarization maps to a single spherical coordinate on the Poincare sphere. The random state of polarization of the modulated optical pulses is scrambled at a pre-defined scrambling rate. The pre-defined scrambling rate lies in a range of Hz to KHz. The pre-defined scrambling rate is defined by a scanning frequency (Fs). The scanning frequency (Fs) is selectively preferred to be less than or equal to a reciprocal of a round trip time (T) of the modulated optical pulses to traverse from a first end to a second end of the optical fiber link 110.

The polarization scrambler 106 is linked through the one or more optical links through an optical circulator 108. The modulated optical pulses having the random states of polarizations are transmitted to the optical circulator 108 through the one or more optical links. In an embodiment of the present disclosure, the optical circulator 108 is a three port optical device. The optical circulator 108 routes the modulated optical pulses through one or more ports. The one or more ports of the optical circulator 108 include a first port, a second port and a third port. The first port of the optical circulator 108 is associated with the polarization scrambler 106. The first port of the optical circulator 108 receives the modulated optical pulses from the polarization scrambler 106 and routes the modulated optical pulses to the second port. The second port of the optical circulator 108 is optically linked with the optical fiber link 110. The optical fiber link 110 includes one or more test fibers, one or more fiber spools joined together through one or more splice joints and/or one or more connector joints. Each test fiber of the one or more test fibers is wound around one or more spools, looped around one or more mandrels of varying bend radii and stressed for point bends. Each spool holds one or more loops of the one or more test fibers. In addition, the one or more mandrels and point bends act as macro-bend, respectively in the optical fiber link 110. The loss events in each test fiber of the one or more test fibers is physically characterized by the one or more macro-bends, the one or more splice joints and the one or more connector joints. The one or more test fibers are geometrically characterized by a number of loops and a number of macro-bends and the like. The one or more macro-bends are characterized by the bend radius and the number of loops. The optical circulator 108 injects the modulated optical pulses in at least one test fiber of one or more test fibers. Each test fiber may be any standard single mode optical fiber. The standard single mode fiber is selected from a group of optical fibers. The group of optical fibers includes but may not be limited to a standard single mode fiber-G.652D fiber, a dispersion shifted fiber-G.653 fiber, a cut-off shifted fiber-G.654 fiber, a non-zero dispersion shifted fiber-G.655 fiber and a bend-insensitive fiber-G.657 fiber. The optical circulator 108 is optically linked to the polarization scrambler 106.

The modulated optical pulses suffer from polarization dependent Rayleigh scattering at each macro-bend of the one or more macro-bends, Also, the modulated optical pulses suffer from polarization independent Rayleigh scattering at the one or more splice joints and the one or more connector joints. A fraction of the modulated optical pulses traverses back from scattering in the one or more macro-bends and travels back as back scattered optical pulses in each test fiber of the one or more test fibers. The back scattered optical pulses are routed from the second port to the third port of the optical circulator 108. The polarization beam splitter 112 is optically linked to the third port of the optical circulator 108. The polarization beam splitter 112 receives the backscattered optical pulses from the third port of the optical circulator 108. The backscattered optical pulses are obtained after Rayleigh scattering in one or more macro-bends of at least one test fiber of the one or more test fibers. The polarization beam splitter 112 is a passive optical device for splitting optical signal to one or more components. The splitting of the optical signal is based on the state of polarization of the optical signal at an interface of the polarization beam splitter 112. The polarization beam splitter 112 splits the backscattered optical pulses in a first optical component and a second optical component. The first optical component and the second optical component are characteristically orthogonally polarized components of the modulated optical pulses. The polarization beam splitter 112 may be of any shape and size. Examples of the shape of polarization beam splitter 112 include but may not be limited to cube, plate, prism and lateral displacement. The first optical component is defined along a first principle polarization state of optical fiber and the second optical component is defined along a second principle polarization state of optical fiber. The first principle polarization state and the second principle polarization of optical fiber are orthogonal. For example, the first principle polarization state is along an X axis and the second principal polarization state is along a Y axis and moreover, the X axis and the Y axis are orthogonal to each other.

The polarization beam splitter 112 is optically linked to the first photo detector 114*a* and the second photo detector 114*b* through a first optical link and a second optical link. The first optical link and the second optical link may be any discrete optical power transfer mediums for transfer of each component of the modulated optical pulses. The first photo detector 114*a* and the second photo detector 114*b* detect the first component and the second component of the backscattered optical pulses travelling through the first optical link and the second optical link respectively. The first photo detector 114*a* measures the first power of the first optical component of the backscattered optical pulses. The second photo detector 114*b* measures the second power of the second optical component of the backscattered optical pulses. The first photo detector 114*a* and the second photo detector 114*b* are optoelectronic devices for detection and measurement of power levels of incoming optical components.

The precision and sensitivity of measurement of the first power and the second power depends on selection of the optical carrier wavelength of the optical signals. The sensitivity of measurement of the first power, the second power and the discrete values of the polarization dependent loss is increased by shifting the optical carrier wavelength from O-band to U-band. In an embodiment of the present disclosure, the optical carrier wavelength is shifted from the O-band to the U-band by changing the operating wavelength of the optical source 102. Further, the first photo detector 114*a* and the second photo detector 114*b* generate electrical signals from the first component and the second component of the back scattered optical pulses. The generated electrical signals are characterized by the pre-defined pulse repetition frequency of the modulated optical pulses. The first photo detector 114*a* and the second photo detector 114*b* are electrically linked to the processing device 116.

The electrical signals from the first photo detector 114*a* and the second photo detector 114*b* are transferred to the processing device 116. The processing device 116 is a signal processing device 116 for resampling and filtering out of band noise from the electrical signals. In an embodiment of the present disclosure, the processing device 116 is a digital signal processor. In another embodiment of the present disclosure, the processing device 116 is digital filtering and resampling circuit. The processing device 116 processes the received electrical signals from the first photo-diode 114*a* and the second photo diode 114*b*. The electrical signals correspond to the backscattered optical pulses. The electrical signals are synchronously resampled and filtered for removal of out of band noise and an improvement in a signal to noise ratio. Further, the processing device 116 synchronously operates at a pre-defined clock repetition frequency of an electrical clock signal. The clock source 118 generates the electrical clock signal for synchronizing operations of the processing device 116 and the pulse generator 104*b*. The clock source 118 may be any electronic device and may implement using any one of the crystal oscillator and oscillator circuit to generate the electrical clock signal. The electrical clock signal is characterized by the pre-defined clock repetition frequency. The clock source 118 is synchronously and electrically linked to the processing device 116 and the pulse generator 104*b*. The pre-defined clock repetition frequency of the processing device 116 matches corresponding clock repetition frequency of the pulse generator 104*b*. The pre-defined clock repetition frequency is set and synchronized by the clock source 118.

The electrical signals from the processing device 116 are transferred to the analyzing device 120. The analyzing device 120 is electrically linked to the processing device 116. The analyzing device 120 may be any instrument for graphical or non-graphical analysis of the electrical signals. Examples of the instrument includes but may not be limited to cathode ray oscilloscopes, digital signal oscilloscopes, mixed signal oscilloscopes, signal analyzers and portable oscilloscopes. The analyzing device 120 analyses the first power of the first optical component and the second power of the second optical component of the backscattered optical pulses. Further, the analyzing device 120 calculates discrete values of polarization dependent loss as a function of distance along a length of the one or more test fibers. Each discrete value of the polarization dependent loss is calculated from a logarithm of a ratio of the first power corresponding to the first optical component and the second power corresponding to the second optical component. Each discrete value of the polarization dependent loss is a function of the bend radius, the number of macro-bends and the pre-defined optical carrier wavelength of the modulated optical pulses. Each discrete value of the polarization dependent loss is represented in decibels (dB).

$$\text{Polarization Dependent Loss(PDL)} = 20 * \log_{10}(\text{First Power of the first optical component/Second Power of the second optical component}) \text{ dB}$$

The analyzing device 120 identifies the macro-bend losses and differentiates them from the splice loss events and the connector loss events along the length of the one or more test fibers. In addition, the analyzing device 120 identifies the macro-bends by analyzing peaks in one or more plots of one or more traces of the discrete values of the polarization dependent loss as the function of distance. The one or more traces are generated from the discrete values of the polarization dependent loss as the function of the distance for each test fiber of the one or more test fibers. Each trace of the one or more traces corresponds to a segment of the length of the one or more test fibers. The polarization dependent loss is measured and traced as the function of the distance along the length of the one or more test fibers. The distance is dependent on selection of the pre-defined optical peak power and the pre-defined optical pulse width of the modulated optical pulses. In an embodiment of the present disclosure, the macro-bend loss events may be manually identified and differentiated from the splice loss events and the connector loss events. In another embodiment of the present disclosure, the macro-bend loss events may be automatically identified and differentiated from the splice loss events and the connector loss events. Moreover, the macro-bend losses are identified using a single wavelength of optical signals and system complexity decreases for the usage of single wavelength optical source. Each discrete value for the polarization dependent loss may be extrapolated to generate a continuous curve. The peaks in each plot of the one or more plots of the polarization dependent loss may correspond to the one or more macro-bends. Moreover, each peak value is characterized by the macro-bend loss event. The macro-bend losses may be automatically identified and differentiated from the splice losses and connector losses by utilizing programming software.

It may be noted that in FIG. 1 and FIGS. 2A and 2B, the optical circulator 108 is a three port optical circulator; however, those skilled in the art would appreciate that more number of optical ports may be present in the optical circulator 108.

FIGS. 2A and 2B illustrate a flowchart 200 for identifying the macro-bend losses and differentiating them from the splice losses and the connector losses in the at least one test fiber, in accordance with various embodiments of the present disclosure. It may be noted that to explain the process steps of flowchart 200, references will be made to the system elements of FIGS. 1A and 1B. It may also be noted that the flowchart 200 may have lesser or more number of steps.

The flowchart 200 initiates at step 202. Following step 202, at step 204, the optical pulse modulator 104a generates the modulated optical pulses. The modulated optical pulses have the pre-defined optical carrier wavelength, the pre-defined optical peak power, the pre-designated optical pulse width and the pre-defined optical pulse repetition frequency. At step 206, the optical circulator 108 injects the modulated optical pulses in each of the one or more test fibers. At step 208, the polarization beam splitter 112 receives the backscattered optical pulses. The backscattered optical pulses correspond to the modulated optical pulses. The backscattered optical pulses are obtained after polarization dependent Rayleigh scattering in the one or more macro-bends of at least one test fiber of the one or more test fibers. At step 210, the polarization beam splitter 112 splits the backscattered optical pulses to the first optical component and the second component. The first optical component and the second optical component are characteristically orthogonal polarized components of the modulated optical pulses. At step 212, the first photo detector 114a and the second photo detector 114b measure the first power of the first optical component and the second power of the second optical component of the backscattered optical pulses respectively. At step 214, the analyzing device 120 calculates the discrete values of the polarization dependent loss as the function of distance along the length of one or more test fibers. At step 216, the analyzing device 120 enables identification of macro-bends along the length of one or more test fibers by analyzing peaks in one or more plots of one or more traces of the discrete values of the polarization dependent loss. The polarization dependent loss is measured as the function of the distance. At step 218, the analyzing device 120 differentiates loss events of one or more macro-bends against the splice loss and connector loss events along the length of the one or more test fibers. The flowchart 200 terminates at step 220.

It may be noted that the flowchart 200 is explained to have above stated process steps; however, those skilled in the art would appreciate that the flowchart 200 may have more/less number of process steps which may enable all the above stated embodiments of the present disclosure.

The present disclosure has several advantages over the prior art. The method as described in the present disclosure provides a concrete solution for distinguishing macro-bend losses from the splice losses and connector losses. The measurement of polarization dependent loss as a function of distance facilitates in easier identification of segments and regions in the optical fiber links having macro-bends. Also, the method as described in the present disclosure helps in visualization of points of macro-bend and macro-bend losses as the function of distance along the entire length of the optical fiber link. The present disclosure enables plot traces of the polarization dependent losses for each segment of the optical fibers. The macro-bend losses are identified using a single wavelength of optical signals from the optical source which significantly reduces the hardware complexity and time for testing optical fiber links during installation and production. The present method also enables installation agencies to identify macro-bends in fiber links currently installed in long haul, metro and access communication networks. The present method facilitates data visualization of polarization dependent losses through real time plots and traces for each segment of the optical fiber link.

The foregoing descriptions of pre-defined embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

What is claimed:

1. A method of identifying one or more macro-bends in an optical fiber communication link and differentiating macro-bend loss events from splice loss events and connector loss events in the optical fiber communication link having at least one test fiber, the method comprising:
generating modulated optical pulses having a pre-defined optical carrier wavelength, a pre-defined optical peak power, a pre-defined optical pulse width, a pre-defined optical pulse repetition frequency and a state of polarization, wherein the state of polarization of modulated optical pulses are scrambled to random states of polarization, wherein the pre-defined optical carrier wavelength lies in a band selected from a group of bands comprising an original band (O-band), an extended band (E-band), a short band (S-band), a conventional band (C-band), a long band (L-band) and an ultra-long band (U-band), wherein the original band is characterized by a wavelength in range of 1260 nm to 1360 nm, the extended band is characterized by a wavelength in range of 1360 nm to 1460 nm, the short band is characterized by a wavelength in a range of 1460 nm to 1535 nm, the conventional band is characterized by a wavelength in a range of 1535 nm to 1565 nm, the long band is characterized by a wavelength in a range of 1565 nm to 1625 nm and the ultra-long band is characterized by a wavelength in a range of 1625 nm to 1675 nm and wherein the pre-defined optical peak power lies in a range of 0 dBm to 10 dBm, the pre-defined optical pulse width lies in a range of picoseconds to seconds and the pre-defined optical pulse-repetition frequency lies in a range of Hz to MHz;
injecting the modulated optical pulses in the at least one test fiber of one or more test fibers;
receiving backscattered optical pulses corresponding to the modulated optical pulses, wherein the backscattered optical pulses are obtained after Rayleigh scattering in the one or more macro-bends, one or more splice joints and one or more connector joints of the at least one test fiber of the one or more test fibers;
splitting the backscattered optical pulses to a first optical component and a second component by a polarization beam splitter, the first optical component and the second optical component are characteristically polarized components of the modulated optical pulses, wherein the first optical component is defined along a first principle polarization state of test fiber and the second optical component is defined along a second principle polarization state of the test fiber and wherein the first principle polarization state of optical fiber and the second principle polarization state of the test fiber are orthogonal;
measuring a first power of the first optical component and a second power of the second optical component of the backscattered optical pulses;
calculating discrete values of polarization dependent loss as a function of distance along a length of the one or more test fibers, the distance is dependent on selection of the pre-defined optical peak power and the pre-defined optical pulse width of the modulated optical pulses;
identifying the one or more macro-bends along the length of the one or more test fibers by analyzing peaks in one or more plots of one or more traces of the discrete values of the polarization dependent loss as the function of the distance; and
differentiating the macro-bend loss events against the splice loss events and the connector loss events along the length of the one or test fibers.

2. The method as recited in claim 1, further comprising processing electrical signals corresponding to the backscattered optical pulses, wherein the electrical signals are synchronously resampled and filtered for removing noise and improving the signal to noise ratio.

3. The method as recited in claim 1, further comprising increasing sensitivity of measuring the first power of the first optical component, the second power of the second optical component and the discrete values of the polarization dependent loss by shifting the pre-defined optical carrier wavelength from O-band to U-band.

4. The method as recited in claim 1, wherein each discrete value of the polarization dependent loss is calculated from a logarithm of a ratio of the first power corresponding to the first optical component and the second power corresponding to the second optical component, wherein each discrete value of the polarization dependent loss is a function of a bend radius, a number of macro-bends and the pre-defined optical carrier wavelength of the modulated optical pulses and wherein the bend-radius lies in a range of 1 mm-30 mm.

5. The method as recited in claim 1, wherein the one or more traces are generated from the discrete values of the polarization dependent loss as the function of the distance for each test fiber of the one or more test fibers, wherein each trace of the one or more traces corresponds to a segment of the length of the one or more test fibers.

6. The method as recited in claim 1, wherein the one or more macro-bends are characterized by a bend radius and a number of loops.

7. The method as recited in claim 1, wherein each random state of polarization maps to a single spherical coordinate on a Poincare sphere, wherein the random states of polarization of the modulated optical pulses is scrambled at a pre-defined scrambling rate and wherein the pre-defined scrambling rate lies in a range of Hz to KHz.

8. The method as recited in claim 1, wherein each test fiber of the one or more test fibers is physically characterized by the one or more macro-bends, the one or more splice joints and the one or more connector points and wherein each test fiber of the one or more test fibers is a single mode fiber.

9. The method as recited in claim 1, wherein each test fiber is selected from a fiber group comprising a standard single mode fiber-G.652D, a dispersion shifted fiber-G.653, a cut-off shifted fiber-G.654, a non-zero dispersion shifted fiber-G.655 and a bend-insensitive fiber-G.657.

10. A system for identifying one or more macro-bends in an optical fiber communication link and differentiating macro-bend loss events from splice and connector loss events, the optical fiber communication link having at least one test fiber, the system comprising:
an optical source for generating optical signals having a pre-defined optical carrier wavelength, a pre-defined optical peak power and a state of polarization;

a pulse generator for generating electrical pulses having a pre-defined pulse width, a pre-defined pulse repetition frequency and a pre-defined electrical RF output power;

an optical pulse modulator for modulating the optical signals to modulated optical pulses having the pre-defined optical pulse width, the pre-defined optical pulse repetition frequency and the state of polarization, wherein the optical pulse modulator is optically linked to the optical source and electrically linked to the pulse generator;

a polarization scrambler for scrambling the state of polarization of the modulated optical pulses to random states of polarization, wherein the polarization scrambler is optically linked to the optical pulse modulator;

an optical circulator for injecting the modulated optical pulses in at least one test fiber of one or more test fibers, wherein the optical circulator is optically linked to the polarization scrambler;

an optical fiber link comprising the one or more test fibers having varying length of span, a number of macro-bend points of varying bend radius and joined together by one or more splice joints and one more connector joints, the optical fiber link emulates an optical link under test, wherein the optical fiber link is optically linked to the optical circulator;

a polarization beam splitter for splitting backscattered optical pulses to a first optical component and a second component, the first optical component and the second optical component are characteristically polarized components of the modulated optical pulses, wherein the first optical component is defined along a first principle polarization state of optical fiber and the second optical component is defined along a second principle polarization state of optical fiber, wherein the first principle polarization state of optical fiber and the second principle polarization state of optical fiber are orthogonal and wherein the polarization beam splitter is optically linked to the optical circulator;

a first photo detector for measuring a first power of the first optical component of the backscattered optical pulses, a second photo detector for measuring a second power of the second optical component of the backscattered optical pulses, wherein the first photo detector and the second photo detector are optically linked to the polarization beam splitter;

a processing device for processing received electrical signals from the first photo detector and the second photo detector, the electrical signals correspond to the backscattered optical pulses, wherein the processing device resamples the received electrical signals, removes unwarranted signal components to filter noise and improves a signal to noise ratio and wherein the processing device is electrically linked to the first photo detector and the second photo detector;

a clock source for generating an electrical clock signal for synchronizing operations of the processing device and the pulse generator, the electrical clock signal has a pre-defined clock repetition frequency; and an analyzing device for calculating discrete values of polarization dependent loss as a function of distance along a length of the one or more test fibers, identify the one or more macro-bends by analyzing peaks in one or more plots of one or more traces of the discrete values of the polarization dependent loss as the function of distance along the length of the one or more test fibers and differentiate the macro-bend loss events from the splice and connector loss events along the length of the one or more test fibers.

11. The system as recited in claim 10, wherein the optical source is directly modulated by the pulse generator for generating the modulated optical pulses and wherein the optical source is optically linked to the polarization scrambler and electrically linked to the pulse generator.

12. The system as recited in claim 10, wherein the one or more traces are generated from the discrete values of the polarization dependent loss as the function of the distance for each test fiber of the one or more test fibers, wherein each trace of the one or more traces corresponds to a segment of the length of the one or more test fibers.

13. The system as recited in claim 10, wherein each discrete value of the polarization dependent loss is calculated from a logarithm of a ratio of the first power corresponding to the first optical component and the second power corresponding to the second optical component, wherein each discrete value of the polarization dependent loss is a function of a bend radius, a number of macro-bends and the pre-defined optical carrier wavelength of the modulated optical pulses and wherein the bend-radius lies in a range of 1 mm-30 mm.

* * * * *